US012152332B2

(12) United States Patent
Song et al.

(10) Patent No.: US 12,152,332 B2
(45) Date of Patent: Nov. 26, 2024

(54) WASHING MACHINE

(71) Applicant: Samsung Electronics Co., Ltd., Suwon-si (KR)

(72) Inventors: Weon Jin Song, Suwon-si (KR); Song Yik Lee, Suwon-si (KR); Hyun Woo Song, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/132,223

(22) Filed: Apr. 7, 2023

(65) Prior Publication Data

US 2023/0243084 A1 Aug. 3, 2023

Related U.S. Application Data

(63) Continuation of application No. 17/565,874, filed on Dec. 30, 2021, now Pat. No. 11,649,579, which is a (Continued)

(30) Foreign Application Priority Data

Jan. 17, 2011 (KR) ........................ 10-2011-0004383

(51) Int. Cl.
*D06F 39/02* (2006.01)
*B67D 3/00* (2006.01)
(Continued)

(52) U.S. Cl.
CPC ............ *D06F 39/028* (2013.01); *D06F 39/02* (2013.01); *D06F 39/022* (2013.01);
(Continued)

(58) Field of Classification Search
CPC ....... D06F 39/02; D06F 39/022; D06F 39/028
See application file for complete search history.

(56) References Cited

U.S. PATENT DOCUMENTS 2,122,216 A 6/1938 Seawell
2,887,255 A 5/1959 Bauerlein
(Continued)

FOREIGN PATENT DOCUMENTS

CN 1098383 C 1/2003
CN 1465799 A 1/2004
(Continued)

OTHER PUBLICATIONS

Chinese Office Action dated Jan. 21, 2020 in Chinese Patent Application No. 201710971806.9.
(Continued)

*Primary Examiner* — Joseph L. Perrin
*Assistant Examiner* — Kevin G Lee
(74) *Attorney, Agent, or Firm* — STAAS & HALSEY LLP

(57) ABSTRACT

A washing machine including a detergent supply device to supply a detergent together with water to a tub. The detergent supply device includes a detergent housing installed within the main body and a detergent accommodation box movably installed within the detergent housing, and the detergent accommodation box is divided into automatic detergent accommodation parts to accommodate a detergent to be supplied automatically and manual detergent accommodation parts to accommodate a detergent to be supplied manually, and the detergent supply device supplies the detergents through an automatic detergent supply method and a manual detergent supply method.

5 Claims, 13 Drawing Sheets

Related U.S. Application Data continuation of application No. 15/792,998, filed on Oct. 25, 2017, now Pat. No. 11,242,639, which is a continuation of application No. 13/348,146, filed on Jan. 11, 2012, now Pat. No. 9,834,879.

(51) Int. Cl.
*D06F 39/08* (2006.01)
*D06F 39/12* (2006.01)

(52) U.S. Cl.
CPC ............ *B67D 3/0003* (2013.01); *D06F 39/08* (2013.01); *D06F 39/12* (2013.01)

(56) References Cited

U.S. PATENT DOCUMENTS

| | | | | |
|---|---|---|---|---|
| 3,089,618 | A | 5/1963 | Albert | |
| 3,144,031 | A | 8/1964 | Long | |
| 4,823,830 | A | 4/1989 | Bucker | |
| 5,782,109 | A | 7/1998 | Spriggs et al. | |
| 5,870,906 | A | 2/1999 | Denisar | |
| 6,036,056 | A | 3/2000 | Lee et al. | |
| 6,179,587 | B1 | 1/2001 | Kurth | |
| 6,434,977 | B1 | 8/2002 | Hapke | |
| 6,588,724 | B2 | 7/2003 | Yie | |
| 7,805,964 | B2 | 10/2010 | Park | |
| 7,934,403 | B2 | 5/2011 | Cho et al. | |
| 2003/0145633 | A1 | 8/2003 | Merkle et al. | |
| 2005/0188729 | A1 | 9/2005 | Zsambeki et al. | |
| 2007/0125134 | A1 | 6/2007 | Park | |
| 2007/0163307 | A1 * | 7/2007 | Kramme | D06F 39/022 68/17 R |
| 2008/0235880 | A1 | 10/2008 | Kim et al. | |
| 2009/0057341 | A1 | 3/2009 | Girard et al. | |
| 2009/0159618 | A1 | 6/2009 | Laible | |
| 2010/0000264 | A1 | 1/2010 | Luckman et al. | |
| 2010/0000586 | A1 | 1/2010 | Henderickson | |
| 2010/0132748 | A1 | 6/2010 | Kessler et al. | |
| 2011/0186098 | A1 | 8/2011 | Hasse et al. | |
| 2012/0019114 | A1 | 1/2012 | Hong et al. | |
| 2016/0237611 | A1 | 8/2016 | Doyle | |

FOREIGN PATENT DOCUMENTS

| | | | | |
|---|---|---|---|---|
| CN | 1746409 | A | 3/2006 | |
| CN | 101168905 | | 4/2008 | |
| CN | 101646821 | | 2/2010 | |
| CN | 101886324 | A | 11/2010 | |
| CN | 202744828 | U | 2/2013 | |
| DE | 1814008 | A1 | 7/1970 | |
| DE | 3403628 | A1 * | 8/1985 | |
| DE | 102006012283 | | 3/2007 | |
| DE | 102007039666 | B3 | 9/2008 | |
| EP | 0238115 | A2 | 9/1987 | |
| EP | 0913514 | A2 | 5/1999 | |
| EP | 1 884 584 | A2 | 2/2008 | |
| EP | 2 003 237 | A1 | 2/2008 | |
| EP | 2013451 | B1 | 1/2009 | |
| EP | 1835063 | B1 | 10/2009 | |
| EP | 2206825 | A1 | 7/2010 | |
| EP | 2251480 | | 11/2010 | |
| EP | 2597190 | A1 | 5/2013 | |
| EP | 2381027 | B1 * | 9/2015 | D06F 39/02 |
| JP | 8-47594 | | 2/1996 | |
| KR | 20-1987-0002303 | | 3/1987 | |
| KR | 10-2003-0004715 | | 1/2003 | |
| KR | 10-2003-0009847 | | 2/2003 | |
| KR | 10-2007-0059425 | | 6/2007 | |
| KR | 10-2009-0084454 | | 8/2009 | |
| KR | 10-2009-0122005 | | 11/2009 | |
| KR | 10-2010-0081254 | | 7/2010 | |
| KR | 10-2010-0120047 | | 11/2010 | |
| KR | 20120043214 | A | 5/2012 | |
| WO | 2005/116323 | | 12/2005 | |
| WO | 2009/142355 | A1 | 11/2009 | |

OTHER PUBLICATIONS

Korean Notice of Allowance dated Jul. 17, 2019 in Korean Patent Application No. 10-2018-0129098.
Chinese Office Action dated Apr. 3, 2019 in Chinese Patent Application No. 201710971806.9.
Korean Office Action dated Jan. 14, 2019 in Korean Patent Application No. 10-2018-0129098.
European Communication under Rule 71(3) dated May 29, 2018 in European Patent Application No. 17174852.8.
Korean Notice of Allowance dated Jul. 27, 2018 in Korean Patent Application No. 10-2017-0170054.
Extended European Search Report dated Sep. 22, 2017 in European Patent Application No. 17174852.8.
Korean Office Action dated Jan. 19, 2018 in Korean Patent Application No. 10-2017-0170054.
Korean Office Action dated Nov. 13, 2017 in Korean Patent Application No. 10-2011-0004383.
Chinese Office Action dated Aug. 3, 2017 in Chinese Patent Application No. 20120023209.0.
Korean Office Action dated Sep. 4, 2017 in Korean Patent Application No. 10-2011-0004383.
European Office Communication dated Jul. 26, 2017 in European Patent Application No. 12150853.5.
Communication under Rule 71(3) dated Feb. 15, 2017 in related European Patent Application No. 12150853.5.
Chinese Office Action issued Jan. 6, 2017 in related Chinese Patent Application No. 201210023209.0.
Korean Office Action dated Feb. 1, 2017 in corresponding Korean Patent Application No. 10-2011-0004383.
European Office Action dated Aug. 10, 2016 from European Patent Application No. 12150853.5.
Chinese Office Action issued Apr. 3, 2015 in corresponding Chinese Patent Application 201210023209.0.
European Search Report dated May 23, 2012 issued in corresponding European Patent Application 12150853.5.
US Notice of Allowance dated Jul. 18, 2017 in U.S. Appl. No. 13/348,146.
US Office Action dated Jan. 6, 2017 in U.S. Appl. No. 13/348,146.
US Office Action dated Jul. 29, 2016 in U.S. Appl. No. 13/348,146.
US Office Action dated Jan. 20, 2016 in U.S. Appl. No. 13/348,146.
US Office Action dated Jul. 31, 2015 in U.S. Appl. No. 13/348,146.
US Office Action dated Mar. 13, 2015 in U.S. Appl. No. 13/348,146.
Machine translation of EP-1835063-B1, dated Oct. 2009 (Year: 2009).
US Notice of Allowance dated Oct. 1, 2021 in U.S. Appl. No. 15/792,998.
Interview Summary dated May 28, 2021 in U.S. Appl. No. 15/792,998.
US Office Action dated Dec. 19, 2021 in U.S. Appl. No. 15/792,998.
Advisory Action dated Jan. 25, 2021 in U.S. Appl. No. 15/792,998.
US Office Action dated Oct. 1, 2020 in U.S. Appl. No. 15/792,998.
US Office Action dated Mar. 23, 2020 in U.S. Appl. No. 15/792,998.
US Office Action dated Oct. 21, 2019 in U.S. Appl. No. 15/792,998.
US Office Action dated Apr. 11, 2019 in U.S. Appl. No. 15/792,998.
Machine translation of CN-101168905-A, dated Apr. 2008 (Year: 2008).
US Non-Final Office Action dated Sep. 12, 2022 in U.S. Appl. No. 17/565,874.
US Notice of Allowance dated Jan. 9, 2023 in U.S. Appl. No. 17/565,874.
U.S. Appl. No. 13/348,146, filed Jan. 11, 2012, Weon Jin Seon et al., Samsung Electronics Co., Ltd.
U.S. Appl. No. 15/792,998, filed Oct. 25, 2017, Weon Jin Seon et al., Samsung Electronics Co., Ltd.
U.S. Appl. No. 17/565,874, filed Dec. 30, 2021, Weon Jin Seon et al., Samsung Electronics Co., Ltd.

* cited by examiner

WASHING MACHINE

CROSS-REFERENCE TO RELATED APPLICATIONS

This application is a continuation of U.S. application Ser. No. 17/565,874, filed on Dec. 30, 2021, which is a continuation of U.S. patent application Ser. No. 15/792,998, filed on Oct. 25, 2017, which is a continuation of U.S. patent application Ser. No. 13/348,146, filed on Jan. 11, 2012, which claims the priority benefit of Korean Patent Application No. 10-2011-0004383, filed on Jan. 17, 2011, in the Korean Intellectual Property Office, the disclosure of which is incorporated herein by reference.

BACKGROUND

1. Field

Embodiments relate to a washing machine with a detergent supply device which automatically supplies a liquid detergent.

2. Description of the Related Art

In general, a washing machine is an apparatus which includes a tub containing water and a drum rotatably installed within the tub, and washes laundry by rotating the drum in which the laundry is placed within the tub.

Such a washing machine further includes a detergent supply device to supply a detergent used for washing to the tub. Recently, a washing machine to which a detergent supply device to use a liquid detergent easily dissolving in water as compared with a powdery detergent has been developed.

SUMMARY

Therefore, it is an aspect of one or more embodiments to provide a washing machine with a detergent supply device which supplies detergents through an automatic detergent supply method and a manual detergent supply method.

It is another aspect of one or more embodiments to provide a washing machine with a detergent supply device which prevents malfunction of valves generated when a liquid detergent remaining on the valves is dried and solidified.

Additional aspects of one or more embodiments will be set forth in part in the description which follows and, in part, will be apparent from the description, or may be learned by practice.

In accordance with an aspect of one or more embodiments, a washing machine includes a main body, a tub disposed within the main body to contain water, a drum rotatably installed within the tub, and a detergent supply device to supply detergents together with water to the tub, wherein the detergent supply device includes a detergent housing installed within the main body and a detergent accommodation box movably installed within the detergent housing, and the detergent accommodation box is divided into automatic detergent accommodation parts to accommodate a detergent to be supplied automatically and manual detergent accommodation parts to accommodate a detergent to be supplied manually, and the detergent supply device supplies the detergents through an automatic detergent supply method and a manual detergent supply method.

The automatic detergent accommodation parts may accommodate a liquid detergent and include detergent discharge parts provided with detergent discharge holes to discharge the detergent, and the detergent supply device may further include valve units disposed at the detergent discharge parts and valve drive devices to operate the valve units.

The automatic detergent accommodation parts may include a main detergent accommodation part to accommodate a liquid main detergent and a rinse accommodation part to accommodate a fabric rinse.

Each of the valve drive devices may include a cam having a fan-shaped cross section and rotated to operate each of the valve units and a detergent supply motor to rotate the cam.

Each of the valve units may include a valve ascending and descending according to rotation of the cam, an ascending/descending guide supporting the valve to ascend and descend the valve, and a valve cap installed at each of the detergent discharge parts to install the ascending/descending guide on each of the detergent discharge parts.

The ascending/descending guide may include a guide hole in which the valve is installed to be capable of ascending and descending, a first valve hole provided adjacent to the guide hole and opened and closed by the valve, and a temporary storage space installed within the ascending/descending guide to temporarily accommodate the liquid detergent, the valve cap may include a second valve hole to discharge the detergent within the temporary storage space to the inside of the detergent housing, and the valve may include a valve shaft installed within the guide hole to be capable of ascending and descending, a first valve part disposed above the value shaft to open and close the first valve hole according to ascending and descending of the valve, and a second valve part disposed under the valve shaft to open and close the second valve hole.

Each of the valve units may include an elastic member provided with one end supported by the ascending/descending guide and the other end supported by the second valve part, and elastically supporting the valve in the downward direction.

The ascending/descending guide may include a support rib extended in the radial direction and inserted into a gap between the lower end of each of the detergent discharge parts and the valve cap.

The cam may support the lower surface of the second valve part and rotated to ascend and descend the valve.

The detergent supply device may further include an automatic water supply guide to guide water to the lower portions of the valve units, and spray holes to spray water toward the lower portions of the valve units and the cams may be provided at the front end of the automatic water supply guide disposed below the valve units.

The detergent supply device may further include an accommodation part cover covering the main detergent accommodation part and the rinse accommodation part and provided with a main detergent inlet and a rinse inlet formed at the front end thereof so that the main detergent and the fabric rinse are put into the main detergent accommodation part and the rinse accommodation part through the main detergent inlet and the rinse inlet, and a rotating cover rotatably installed on the accommodation part cover and rotated to open and close the main detergent inlet and the rinse inlet.

The accommodation part cover and the rotating cover may be made of a transparent material.

The detergent accommodation box may include a front cover forming the front surface thereof, and a tray installed at the rear of the front cover and provided with the main detergent accommodation part and the rinse accommodation part, the front cover may include display windows enabling a user to observe the heights of the main detergent and the fabric rinse accommodated in the main detergent accommodation part and the rinse accommodation part, and the tray may include transmission parts provided at positions corresponding to the display windows, and detergent guide grooves provided on the lower surfaces of the main detergent accommodation part and the rinse accommodation part, provided with lower surfaces extended to have heights corresponding to the lowest portions of the lower surfaces of the main detergent accommodation part and the rinse accommodation part, and connected to the lower portions of the transmission parts.

The tray may be formed of a transparent material.

The manual detergent accommodation parts may include a powdery detergent accommodation part to accommodate a powdery detergent and a bleach accommodation part to accommodate a bleach.

The detergent supply device may include a housing cover installed to cover the upper surface of the detergent housing and a manual water supply guide fixed to the lower surface of the housing cover to supply water to the manual detergent accommodation parts, and the inside of the manual detergent accommodation parts may be divided into a powdery detergent water supply channel to supply water to the powdery detergent accommodation part and a bleach water supply channel to supply water to the bleach accommodation part.

The detergent supply device may further include an accommodation part cover covering the automatic detergent accommodation parts, the accommodation cover may include a powdery detergent inlet to inject the powdery detergent into the powdery detergent accommodation part therethrough and a bleach inlet to inject the bleach into the bleach accommodation part therethrough, and water supply holes may be provided on the lower surfaces of the powdery detergent water supply channel and the bleach water supply channel at positions corresponding to the powdery detergent inlet and the bleach inlet.

The accommodation part cover may further include an inclined guide which is downward inclined toward the bleach inlet and formed adjacent to the bleach inlet.

The washing machine may further include a manual supply selection button to select one of the detergent supply methods.

The washing machine may further include an additional detergent button to additionally inject the detergent.

In accordance with another aspect of one or more embodiments, a washing machine includes a main body, a tub disposed within the main body to contain water, a drum rotatably installed within the tub, and a detergent supply device to supply detergents together with water to the tub, wherein the detergent supply device includes a detergent housing installed within the main body, a detergent accommodation box accommodating an amount of a liquid detergent required to execute washing plural times and provided with detergent discharge holes to discharge the detergent, valve units disposed at the detergent discharge holes to restrictedly discharge a portion of the liquid detergent accommodated in the detergent accommodation box through the detergent discharge holes, and valve drive devices to operate the valve units.

BRIEF DESCRIPTION OF THE DRAWINGS

These and/or other aspects of one or more embodiments will become apparent and more readily appreciated from the following description of embodiments, taken in conjunction with the accompanying drawings of which.

DETAILED DESCRIPTION

Figure 1:
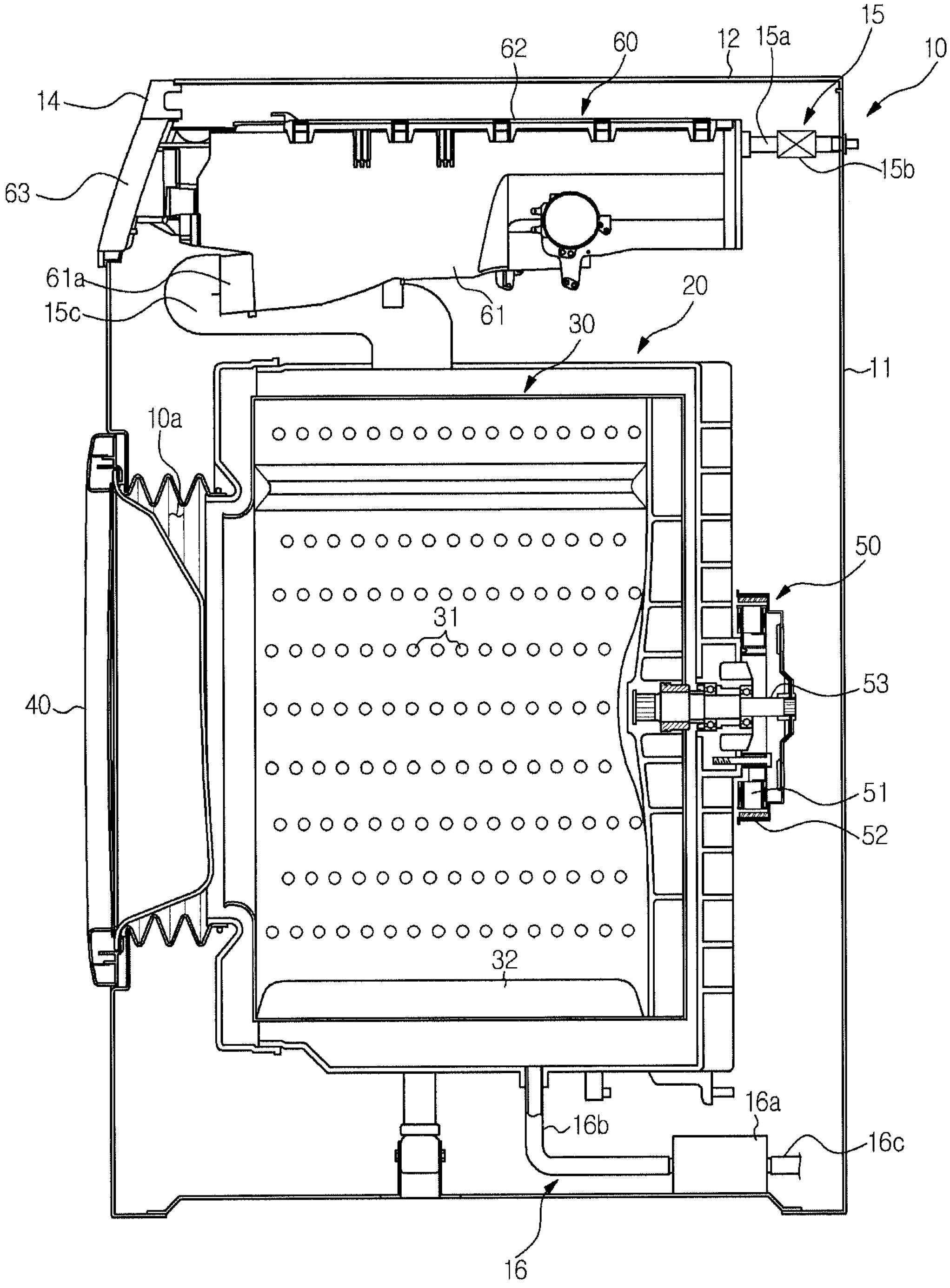
FIG. 1 is a schematic view of a washing machine in accordance with an embodiment.

Reference will now be made in detail to embodiments, examples of which are illustrated in the accompanying drawings, wherein like reference numerals refer to like elements throughout.

Hereinafter, a washing machine in accordance with an embodiment will be described with reference to the accompanying drawings.

In an embodiment, a drum washing which washes laundry using a difference in elevation will be exemplarily described.

As shown in FIG. 1, the washing machine in accordance with an includes a main body 10 forming the external appearance of the washing machine, a tub 20 suspended within the main body 10 to contain water, a drum 30 rotatably installed within the tub 20, a door 40 to open and close a laundry inlet 10*a* provided to put laundry into the drum 30 therethrough, and a drum drive motor 50 installed on the rear surface of the tub 20 and generating rotary force to rotate the drum 30.

Therefore, the laundry within the drum 30 is raised upward and then fallen downward and is thus washed using a difference in elevation by rotating the drum 30 by the drum drive motor 50 under the condition that the laundry is put into the drum 30 through the inlet 30*a* by opening the door 40.

Communication holes 31 through which water within the tub 20 is introduced into the drum 30 are provided on the drum 30, and lifters 32 to raise the laundry upward are arranged on the inner surface of the drum 30.

The main body 10 includes a main body frame 11 forming front, rear and both side surfaces of the main body 10, a cover frame 12 covering the upper portion of the main body frame 11, and a support bar 13 provided with one end fixed to the upper end of the front surface of the main body frame 11 and the other end fixed to the upper end of the rear surface of the main body frame 11 to support the lower surface of the cover frame 12. Further, a control panel 14 enabling a user to select operation of the washing machine is arranged at the upper portion of the front surface of the main body 10.

A water supply device 15 to supply water to the tub 20 and a detergent supply device 60 to mix the water supplied by the water supply device 15 with a detergent and then to supply the water containing the detergent to the tub 20 are disposed at the upper portion of the inside of the main body 10. The water supply device 15 includes water supply pipes 15*a* connected to an external water supply source, water supply valves 15*b* to respectively open and close the water supply pipes 15*a*, and a water supply hose 15*c* connecting the detergent supply device 60 to the tub 20 to guide the water and the detergent to the tub 20.

A drain device 16 to discharge water used for washing to the outside after washing of the laundry has been completed is disposed under the tub 20. The drain device 16 includes a drain pump 16*a* to discharge water within the tub 20, a drain pipe 16*b* connecting the tub 20 and the drain pump 16*a* to each other, and a drain hose 16*c* provided within one end connected to the drain pump 16*a* and the other end extended to the outside of the main body 10.

The drum drive motor 50 includes a stator 51 installed on the tub 20, a rotor 52 rotating while interacting with the stator 51, and a rotary shaft 53 provided with one end installed at the rotor 52 and the other end passing through the rear surface of the tub 20 and installed at the drum 30 to rotate the drum 30 together with the rotor 52.

The detergent supply device 60 may supply detergents through an automatic detergent supply method and a manual detergent supply method according to user's selection, and the automatic detergent supply method is configured to additionally inject a detergent according to user's need.

Figure 2:
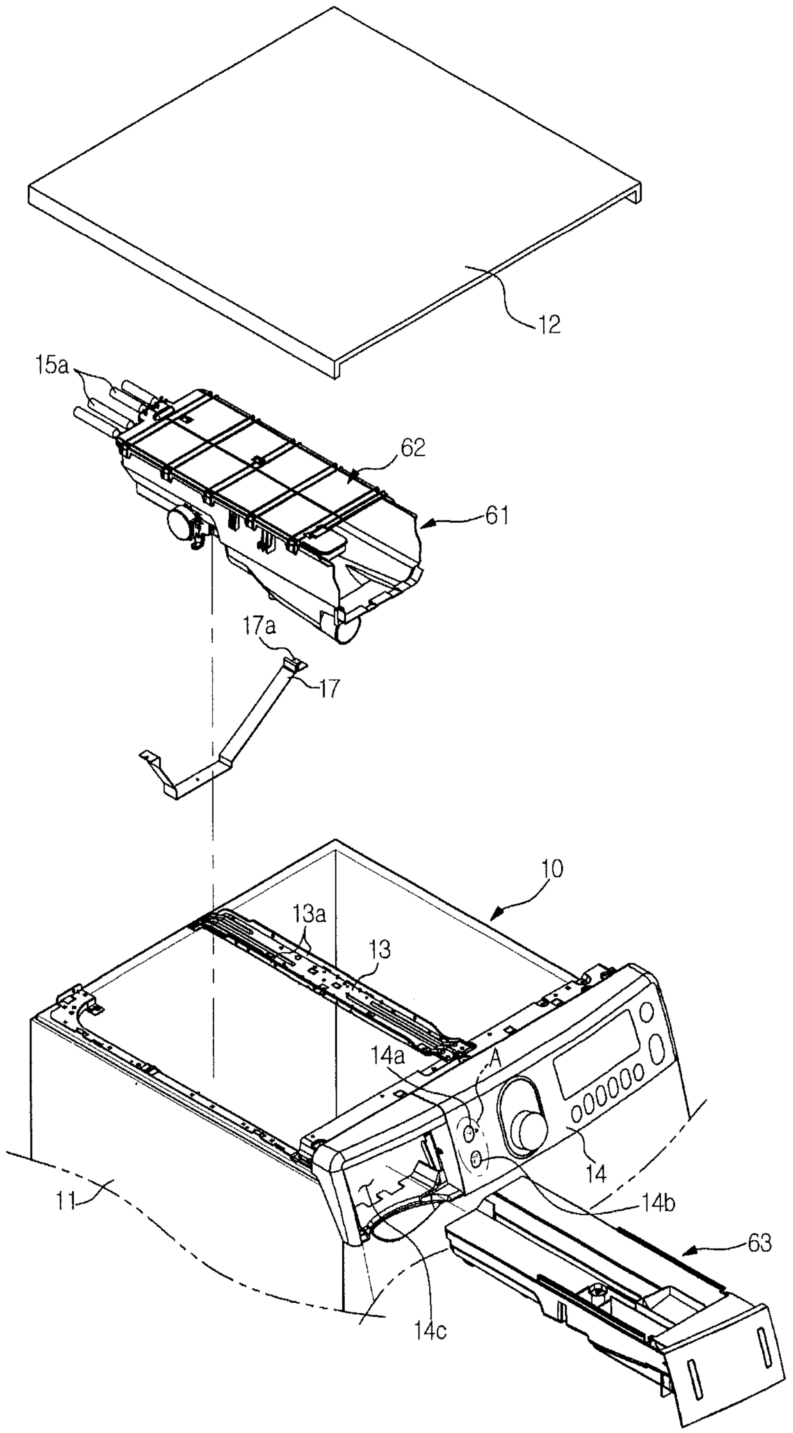
FIG. 2 is an exploded perspective view illustrating an installed state of a detergent supply device applied to the washing machine in accordance with an embodiment.
Figure 3:
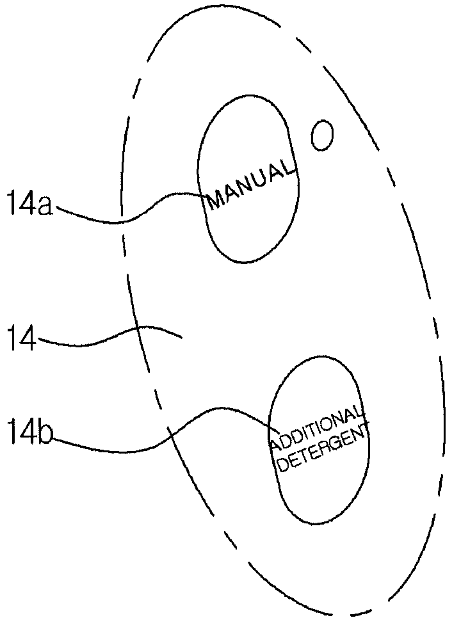
FIG. 3 is an enlarged view of the portion ‘A’ of FIG. 2.

In order to enable a user to select one of the above detergent supply methods and detergent additional injection, as described above, the control panel 14 includes a manual supply selection button 14*a* to select one of the detergent supply methods and an additional detergent button 14*b* to additionally inject the detergent, as shown in FIGS. 2 and 3. Therefore, the user may select one of the detergent supply methods through the manual supply selection button 14*a* and additionally inject the detergent through the additional detergent button 14*b*.

Figure 4:
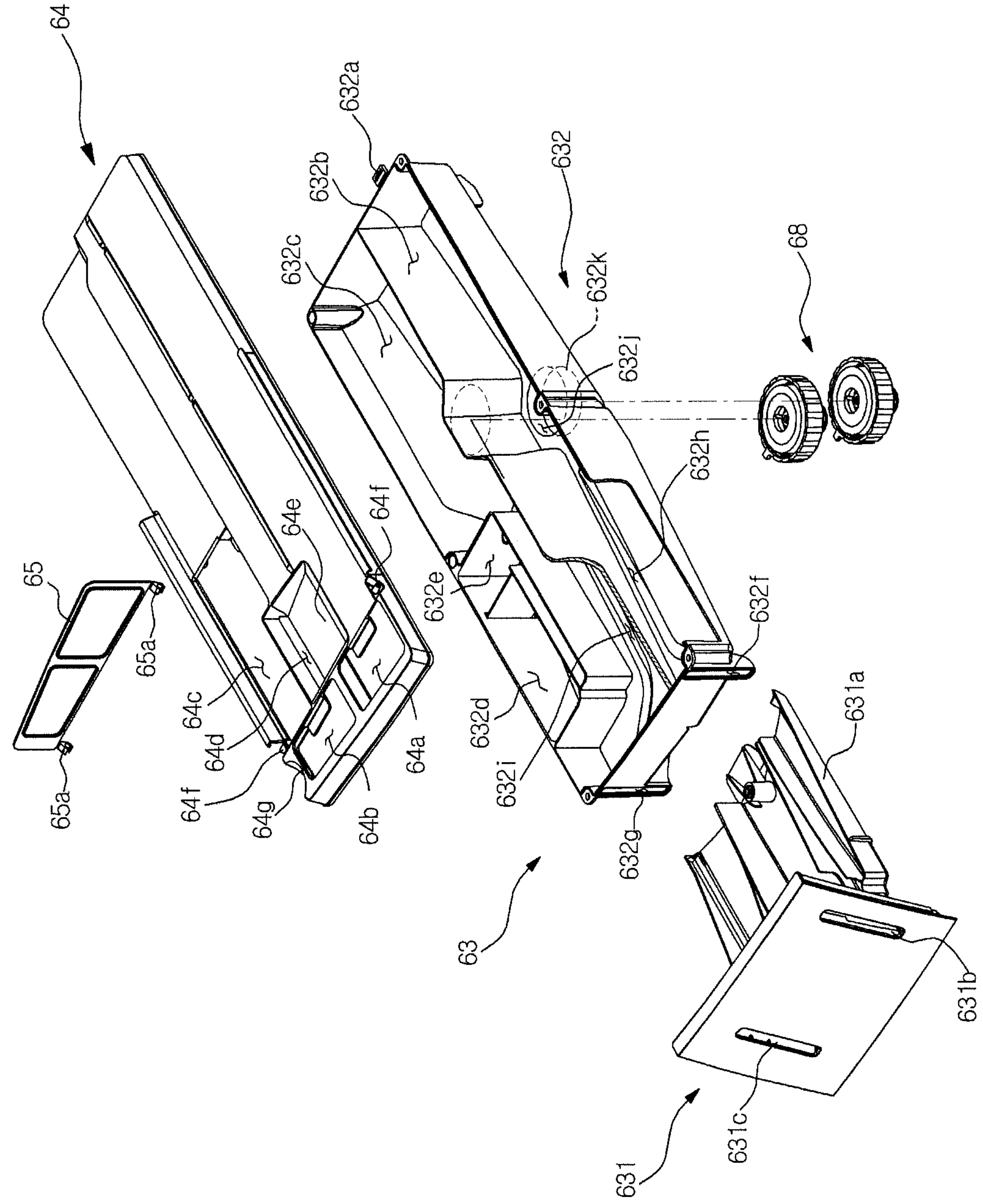
FIG. 4 is an exploded perspective view illustrating a detergent accommodation box and an accommodation part cover applied to the washing machine in accordance with an embodiment.
Figure 5:
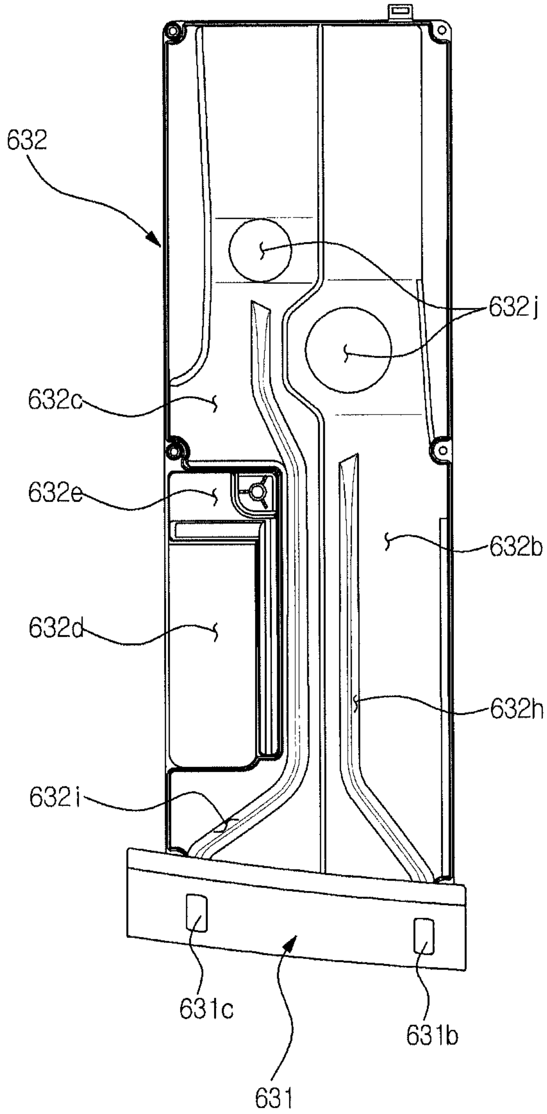
FIG. 5 is a plain view of the detergent accommodation box applied to the washing machine in accordance with an embodiment.
Figure 6:
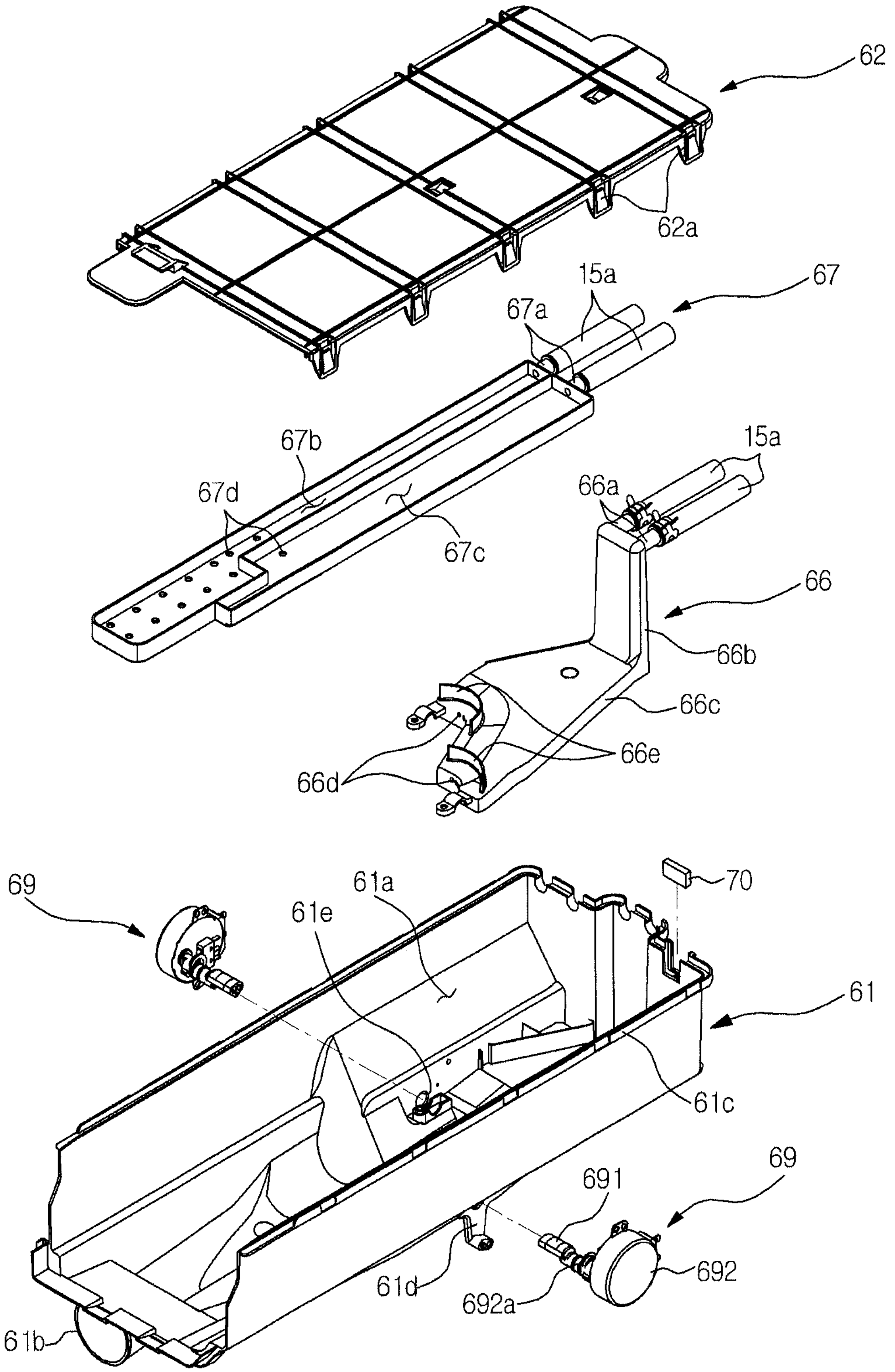
FIG. 6 is an exploded perspective view illustrating a detergent housing and a housing cover applied to the washing machine in accordance with an embodiment.

The detergent supply device 60, as shown in FIGS. 4 to 6, includes a detergent housing 61 installed within the main body 10, a housing cover 62 installed to cover the upper portion of the detergent housing 61, a detergent accommodation box 63 movably installed within a space formed by the detergent housing 61 and the housing cover 62 to contain detergents therein, an accommodation part cover 64 covering the detergent accommodation box 63 to prevent the detergents within the detergent accommodation box 63 from overflowing during transfer of the detergent accommodation box 63, and water supply guides 66 and 67 to mix water with the detergents.

The detergent housing 61 is provided with an accommodation space 61*a* in which the detergent accommodation box 63 is accommodated, and is fixed within the main body 10 such that the front surface and the upper surface of the detergent housing 61 are opened to install the detergent accommodation box 63 and the water supply guides 66 and 67. A connection part 61*b* connected to the water supply hose 15*c* to supply the detergent and water to the tub 20 is provided at the lower portion of the front surface of the detergent housing 61. The front end of the detergent housing 61 is fixed to one side of the control panel 14 disposed at the upper portion of the front surface of the main body 10. An opening 14*c* through which the detergent accommodation box 63 is retracted into and extracted from the detergent housing 61 is provided at one side of the control panel 14.

A sensor 70 to detect whether or not the detergent accommodation box 63 is completely retracted into the detergent housing 61 is disposed at the rear surface of the detergent housing 61, and a sensing part 632*a* disposed on the sensor 70 when the detergent accommodation box 63 is completely retracted into the detergent housing 61 is formed at the rear end of the detergent accommodation box 63. The sensor 70 may be a magnet sensor which senses a magnetic field, and a magnet is disposed in the sensing part 632.

In order to prevent the rear end of the detergent supply device 60 from sagging due to its own weight, a support member 17 to support the rear end of the detergent housing 61 is installed on the main body 10. The support member 17 is provided with one end installed on the support bar 13 and the other end fixed to the upper end of one side of the main body frame 11, and the middle portion of the support member 17 is bent downward to support the lower surface of the detergent housing 61 so that the lower surface of the rear portion of the detergent housing 61 is supported by the upper surface of the support member 17.

Reinforcing ribs 13*a* to reinforce the support bar 13 protrude upward from both sides of the support bar 13, and a hanging part 17*a* bent upward to be hang on the reinforcing rib 13*a* is provided at one end of the support member 17 installed on the support bar 13. Therefore, the end of the support member 17 is fixed to the support bar 13 through a screw under the condition that the hanging part 17*a* is hang on the reinforcing rib 13*a*, and the other end of the support member 17 is fixed to the upper end of the side surface of the main body frame 11 through a screw.

The housing cover 62 is installed to cover the upper portion of the detergent housing 61 through a snap-fit connection method. For this purpose, a plurality of hooks 62*a* is provided at the edge of the housing cover 62, and a protruding part 61*c* which protrudes outward is provided along the upper end of the detergent housing 61.

The detergent accommodation box 63 includes a front cover 631 forming a portion of the front surface of the washing machine, and a tray 632 installed at the rear of the front cover 631 to be movable within the accommodation space 61*a* of the detergent housing 61 and provided with detergent accommodation parts 632*b*, 632*c*, 632*d* and 632*e* in which detergents to be supplied are respectively stored. The tray 632 is formed of a transparent material to enable a user to easily observe the inside of the tray 632, and the inside of the tray 632 is divided into automatic detergent accommodation parts 632*b* and 632*c* in which a detergent to be automatically supplied is accommodated and manual detergent accommodation parts 632*d* and 632*e* in which a detergent to be manually supplied is accommodated.

The automatic detergent accommodation parts 632*b* and 632*c* include a main detergent accommodation part 632*b* to automatically supply a liquid main detergent and a rinse accommodation part 632*c* to automatically supply a liquid fabric rinse, and the manual detergent accommodation parts 632*d* and 632*e* include a powdery detergent accommodation part 632*d* to supply a powdery detergent and a bleach accommodation part 632*e* to supply a bleach.

Here, a large amount of the main detergent and a large amount of the fabric rinse are injected into the main detergent accommodation part 632*b* and the rinse accommodation part 632*c* of the automatic detergent accommodation parts 632*b* and 632*c* so as to execute washing plural times, and are partially used whenever washing of the laundry is carried out. When the automatic detergent accommodation parts 632*b* and 632*c* are provided, washing of laundry is repeated until the detergent and the fabric rinse accommodated in the main detergent accommodation part 632*b* and the rinse accommodation part 632*c* are exhausted without injection of the main detergent or the fabric rinse whenever washing of laundry is carried out, and thus use of the washing machine is convenient.

For this purpose, the main detergent accommodation part 632*b* accommodates 1.91 of the liquid detergent in the case of a large-size washing machine and accommodates 1.5 liter of the liquid detergent in the case of a medium/small-size washing machine, and the rinse accommodation part 632 accommodates 1.5 liter of the fabric rinse in the case of a large-size washing machine and accommodates 0.5 liter of the fabric rinse in the case of a medium/small-size washing machine.

The front cover 631 includes a bracket part 631*a* extended rearward from the rear surface thereof. The bracket part 631*a* is connected to the front portion of the lower surface of the tray 632 and disperses force, applied to the front cover 631 when the detergent accommodation box 63 is extracted or retracted, throughout the tray 632.

Further, display windows 631*b* and 631*c* are provided at both sides of the front surface of the front cover 631, thereby enabling the user to check the heights of the main detergent and the fabric rinse respectively accommodated in the main detergent accommodation part 632*b* and the rinse accommodation part 632*c* through the display windows 631*b* and 631*c*. The two display windows 631*b* and 631*c* include a main detergent display window 631*b* to display the height of the main detergent and a rinse display window 631*c* to display the height of the fabric rinse.

Transmission parts 632*f* and 632*g* extended vertically and connected to the rear portions of the display windows 631*b* and 631*c* to display the heights of the main detergent and the rinse contained in the main detergent accommodation part 632*b* and the rinse accommodation part 632*c* are provided on the front surface of the tray 632. The tray 632 is formed of a transparent material, and thus the transmission parts 632*f* and 632*g* are formed of the transparent material. Therefore, a user located in front of the front cover 631 may observe the heights of the main detergent and the fabric rinse contained in the tray 632 through the display windows 631*b* and 631*c* and the transmission parts 632*f* and 632*g*.

The lower surface of the front portion of the tray 632 is downward inclined toward detergent discharge parts 632*k*, which will be described later, to guide the main detergent and the fabric rinse to the detergent discharge parts 632*k*. That is, a region of the lower surface of the tray 632 located in front of the detergent discharge parts 632*k* is downward inclined backwardly toward the detergent discharge parts 632*k*, and a region of the lower surface of the tray 632 located at the rear of the detergent discharge parts 632*k* is downward inclined forwardly toward the detergent discharge parts 632*k*. Here, when the region of the lower surface of the tray 632 located in front of the detergent discharge parts 632*k* is downward inclined backwardly toward the detergent discharge parts 632*k*, as describe above, movement of water supplied to the detergent housing 61 toward the front cover 631 along the lower surface of the tray 632 is prevented.

Since the lower surface of the front portion of the tray 632 is downward inclined backwardly toward the detergent discharge parts 632*k*, as describe above, two detergent guide grooves 632*h* and 632*i* respectively connected to the lower portions of the two transmission parts 632*f* and 632*g* are provided on the lower surfaces of the main detergent accommodation part 632*b* and the rinse accommodation part 632*c* of the tray 632, as shown in FIG. 5. The lower surfaces of the detergent guide grooves 632*h* and 632*i* are extended to have heights corresponding to the lowest portions of the inner lower surfaces of the main detergent accommodation part 632*b* and the rinse accommodation part 632*c*, thereby enabling the heights of the liquid detergent and the fabric rinse contained in the tray 632 to be precisely displayed through the display windows 631*b* and 631*c*.

The accommodation part cover 64 is formed of a transparent material to allow a user to easily observe the detergents contained in the tray 63, and covers the upper portions of the main detergent accommodation part 632*b* and the rinse accommodation part 632*c* to accommodate the liquid detergent and the fabric rinse to prevent the liquid main detergent and fabric rinse from being dried. Further, the accommodation part cover 64 serves to prevent the liquid detergent and fabric rinse from overflowing the tray 632 during transfer of the detergent accommodation box 63.

A main detergent inlet 64*a* and a rinse inlet 64*b* through which the liquid main detergent and the fabric rinse are injected into the main detergent accommodation part 632*b* and the rinse accommodation part 632*c* are provided in parallel at the front end of the accommodation part cover 64, and a rotating cover 65 to open and close the main detergent inlet 64*a* and the rinse inlet 64*b* is installed on the accommodation part cover 64. The rotating cover 65 is formed of a transparent material in the same manner as the accommodation part cover 64, and hinge parts 65*a* provided at both sides of the rotating cover 65 are rotatably connected to hinge protrusions 64*f* provided at both sides of the accommodation part cover 64 so that the rotating cover 65 is rotated to simultaneously open and close the main detergent inlet 64*a* and the rinse inlet 64*b*. A recess 64*g* to allow a user to easily apply force to the rotating cover 65 to rotate the rotating cover 65 is provided at one side of the rinse inlet 64*b* of the tray 632.

Further, a powdery detergent inlet 64*c* through which the powdery detergent is injected into the powdery detergent accommodation part 632*d* and a bleach inlet 64*d* through which the bleach is injected into the bleach accommodation part 632*e* are provided on the accommodation part cover 64 at the rear of the rinse inlet 64*b*. Since the bleach inlet 64*d* has a very small width in terms of the arrangement structure of the detergent accommodation parts 632*b*, 632*c*, 632*d* and 632*e*, an inclined guide 64*e* which is downward inclined toward the bleach inlet 64*d* is formed adjacent to the bleach inlet 64*d* of the accommodation part cover 64.

In order to supply the liquid main detergent and fabric rinse accommodated in the main detergent accommodation part 632*b* and the rinse accommodation part 632*c* to the tub 20, the detergent discharge parts 632*k* extended into a hollow cylindrical shape to form detergent discharge holes 632*j* are respectively provided on the lower surfaces of the main detergent accommodation part 632*b* and the rinse accommodation part 632*c*, and the detergent supply device 60 includes two valve units 68 to selectively discharge the liquid main detergent and fabric rinse through the two detergent discharge holes 632*j* and two valve drive devices 69 to independently operate the two valve units 68.

Figure 7:
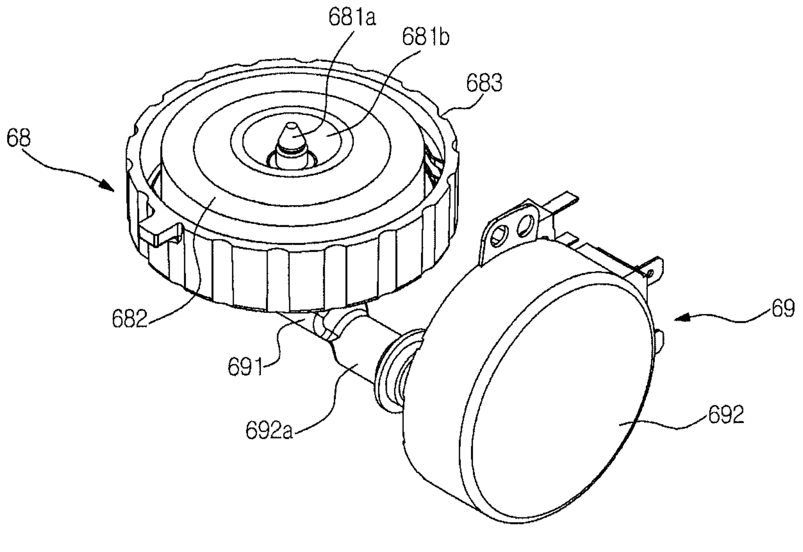
FIG. 7 is a perspective view illustrating a valve unit and a valve drive device applied to the washing machine in accordance with an embodiment.
Figure 8:
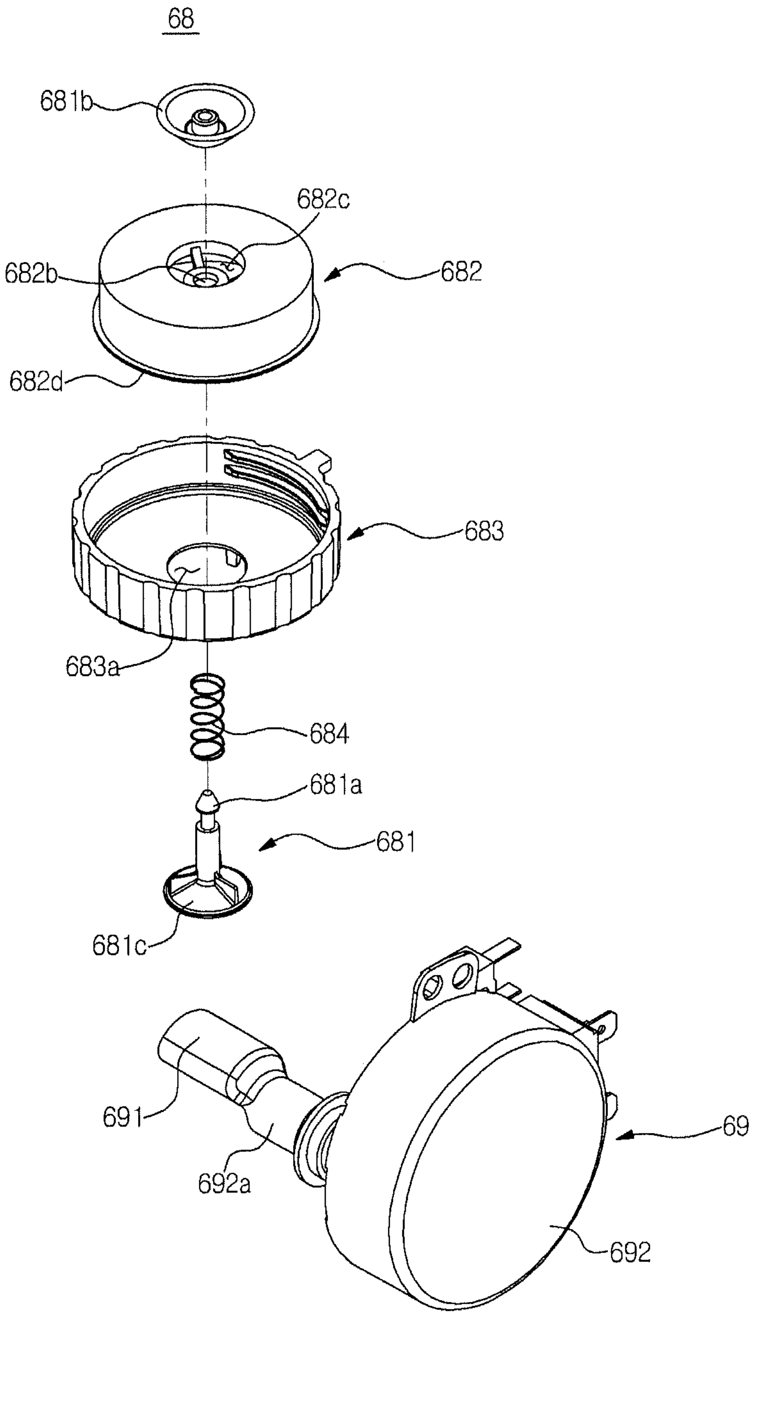
FIG. 8 is an exploded perspective view illustrating the valve unit and the valve drive device applied to the washing machine in accordance with an embodiment.

The valve unit 68, as shown FIGS. 7 and 8, includes a valve 681 ascending and descending to open and close the detergent discharge part 632*k*, an ascending/descending guide 682 to guide ascending and descending of the valve 681, a valve cap 683 to install the ascending/descending guide 682 on the detergent discharge part 632*k*, and an elastic member 684 to elastically support the valve 681.

The ascending/descending guide 682 is formed in a hollow cylindrical shape and is provided with a temporary storage space 682*a* to temporarily accommodate the liquid main detergent or fabric rinse, and a guide hole 682*b* in which the valve 681 is installed to be capable of ascending and descending, and a first valve hole 682*c* located adjacent to the guide hole 682*b* to pass the liquid main detergent or fabric rinse. Further, a support rib 682*d* protruding in the radial direction is provided on the outer circumferential surface of the lower end of the ascending/descending guide 682, and is inserted into a gap between the lower end of the detergent discharge part 632*k* and the inner surface of the valve cap 683 during a process of coupling the valve cap 683 with the detergent discharge part 632*k*, thereby maintaining a state in which the ascending/descending guide 682 is installed on the detergent discharge part 632*k*.

The valve cap 683 includes a second valve hole 683*a* to discharge the detergent temporarily stored in the temporary storage space 682*a* of the ascending/descending guide 682 to the inside of the detergent housing 61, and is connected to the detergent discharge part 632*k* of the tray 632 through a screw connection method.

The valve 681 includes a valve shaft 681*a* installed within the guide hole 682*b* to be capable of ascending and descending, a first valve part 681*b* formed of a elastically deformable material, such as rubber, and disposed above the value shaft 681*a* to open and close the first valve hole 682*c* according to ascending and descending of the valve 681, and a second valve part 681*c* formed integrally with the lower end of the valve shaft 681*a* to open and close the second valve hole 683*a* according to ascending and descending of the valve 681. The lower surface of the second valve part 681*c* is supported by a cam 691 which will be described later so that the valve 681 ascends and descends by force transmitted from the cam 691 through the second valve part 681*c*. As the valve 681 ascends, the first valve hole 682*c* is opened and the second valve hole 683*a* is closed, and as the valve 681 descends, the first valve hole 682 is closed and the second valve hole 683*a* is opened.

The elastic member 684 is provided with one end supported by the lower surface of a portion of the ascending/descending guide 682 adjacent to the guide hole 682*b* and the other end supported by the upper surface of the second valve part 681*c*, and elastically supports the valve 681 in the downward direction.

The two valve drive devices 69 are installed at both sides of the detergent housing 61, and each of the two valve drive devices 69 includes the cam 691 rotated to ascend and descend the valve 681 and a detergent supply motor 692 to rotate the cam 691.

The cam 691 has a fan-shaped cross section and is rotated by the detergent supply motor 692 to ascend and descent the valve 681 based on the rotating angel thereof. The cam 691, as shown in FIG. 6, is disposed under the valve 681 of the detergent accommodation box 63 retracted into the detergent housing 61 within the detergent housing 61, and applies force to the valve 681 through the lower end of the valve 681, i.e., the lower surface of the second valve part 681*c*.

The detergent supply motor 692 is installed at each of motor installation parts 61*d* provided at both sides of the lower portion of the detergent housing 61, and a rotary shaft 692*a* of the detergent supply motor 692 is connected to the cam 691 disposed within the detergent housing 61 through a shaft installation hole 61*e* provided on the detergent housing 61 and transmits rotary force to the cam 691.

The water supply guides 66 and 67 include an automatic water supply guide 66 connected to the water supply pipes 15*a* and disposed under the detergent accommodation box 63 retracted into the detergent housing 61, and a manual water supply guide 67 installed on the lower surface of the housing cover 62 and disposed on the accommodation part cover 64 to supply water to the powdery detergent accommodation part 632*d* and the bleach accommodation part 632*e* of the manual detergent accommodation parts 632*d* and 632*e*.

The automatic water supply guide 66 is configured to guide water to the lower portion of the detergent accommodation box 63 retracted into the detergent housing 61 and to spray water toward the lower ends of the valve units 68 disposed under the detergent accommodation box 63. The automatic water supply guide 66 includes automatic water supply ports 66*a* provided at the rear end thereof and connected to the water supply pipes 15*a*, an extension part 66*b* extended downward to guide water in the downward direction, and a spray part 66*c* extended forward from the lower end of the extension part 66*b* and provided with spray holes 66*d* formed at the front end thereof to spray water toward the lower ends of the valve units 68. Shields 66*e* disposed in an arc shape around the valve caps 683 to prevent water from being splashed backward are formed on the upper surface of the spray part 66*c*.

The manual water supply guide 67 includes manual water supply ports 67*a* provided at the rear end thereof and connected to the water supply pipes 15*a*, and a powdery detergent water supply channel 67*b* and a bleach water supply channel 67*c*, upper surfaces of which are opened. The manual water supply guide 67 is fixed to the lower surface of the housing cover 62 through heat fusion, etc., and thus the upper surfaces of the powdery detergent water supply channel 67*b* and the bleach water supply channel 67*c* are closed. Water supply holes 67*d* to supply water to powdery detergent accommodation part 632*d* and the bleach accommodation part 632*e* through the lower surface of the manual water supply guide 67 are provided on the lower surface of the manual water supply guide 67 at positions corresponding to the powdery detergent accommodation part 632*d* and the bleach accommodation part 632*e*.

Hereinafter, operation of the above-described detergent supply device of the washing machine will be described with reference to the accompanying drawings.

Figure 9:
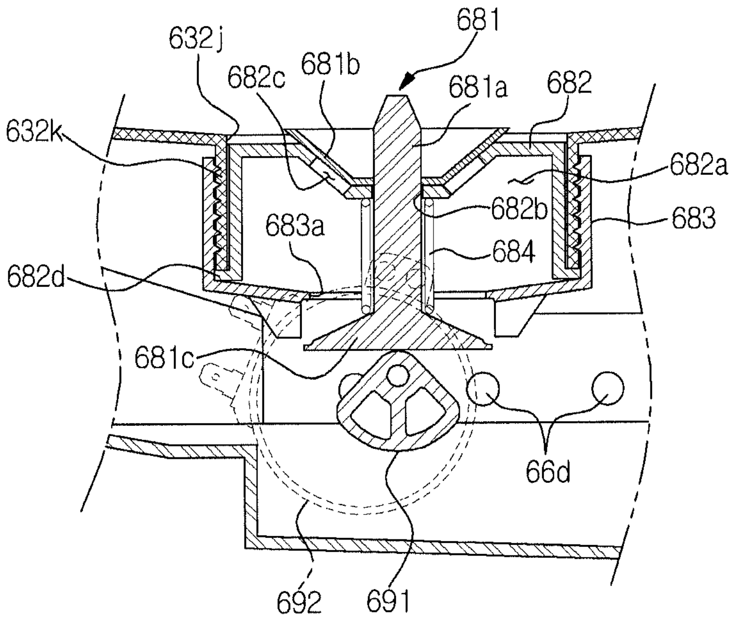
FIGS. 9 to 11 are sectional views illustrating operation of the valve unit and the valve drive device applied to the washing machine in accordance with an embodiment.
Figure 10:
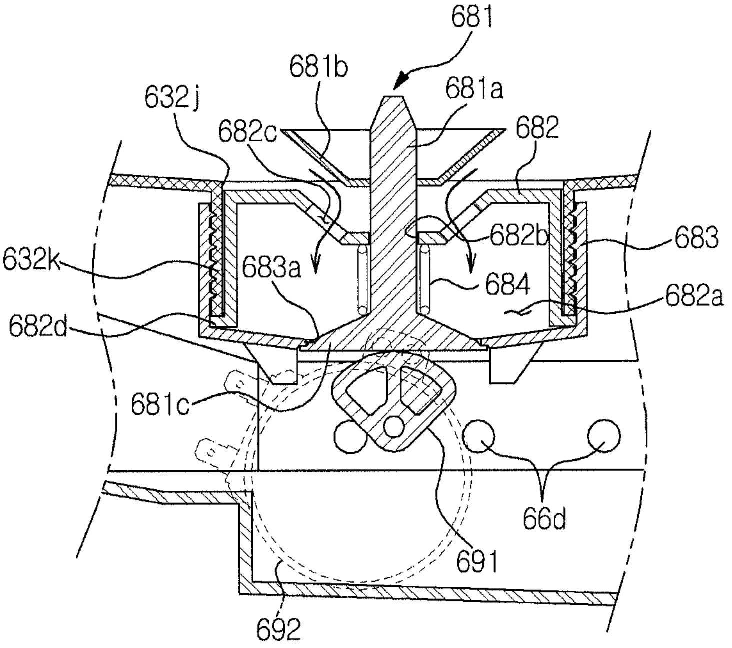

When the cam 691 is rotated by the detergent supply motor 692 under the condition that the first valve hole 682*c* is closed by the first valve part 681*b*, as shown in FIG. 9, the valve 681 ascends by the cam 691, as shown in FIG. 10. As the valve 681 ascends, the first valve hole 682*c* having being closed by the first valve part 681*b* is opened and the second valve hole 683*a* is closed by the second valve part 681*c*. Therefore, a portion of the main detergent or the fabric rinse accommodated in the main detergent accommodation part 632*b* or the rinse accommodation part 632*c* is introduced into the temporary storage space 682*a* provided within the ascending/descending guide 682 through the first valve hole 682*c*.

Figure 11:
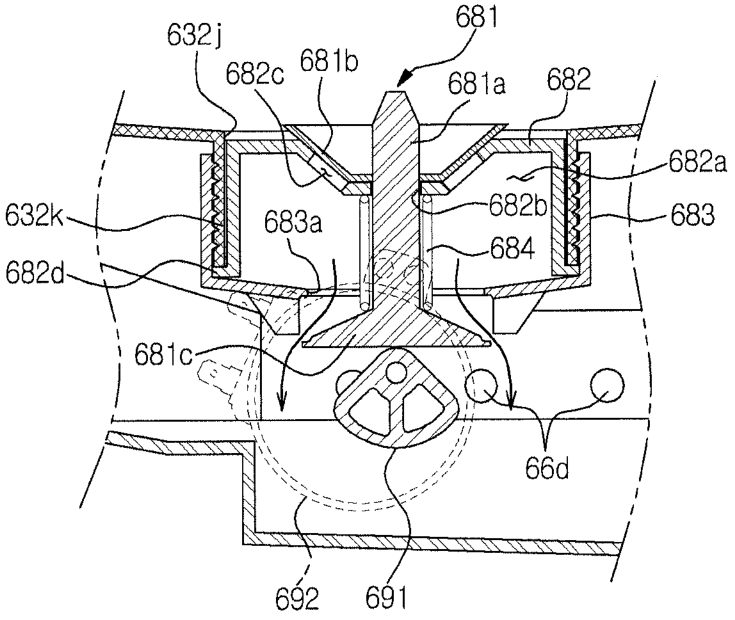

When the cam 691 is rotated again by the detergent supply motor 692 after a designated time has elapsed and then a designated amount of the detergent fills the temporary storage space 682*a* of the ascending/descending guide 682, the valve 681 having ascent by the cam 691 descends by elastically restoring force of the elastic member 684, as shown in FIG. 11. As the valve 681 descends, the first valve hole 682*c* is closed by the first valve part 681*b* and the second valve hole 683*a* having been closed by the second valve part 681*c* is opened. Therefore, the detergent filling the temporary storage space 682*a* of the ascending/descending guide 682 is transmitted to the inside of the detergent housing 61 through the second valve hole 683*a*.

During the above process of discharging the detergent to the inside of the detergent housing 61 through the second valve hole 683*a*, the spray holes 66*d* of the automatic water supply guide 66 spray water. The sprayed water is mixed with the detergent discharged through the second valve hole 683*a*, and is then supplied to the tub 20 through the water supply hose 15*c* connected to the detergent housing 61.

Since the spray holes 66*d* are configured to spray water toward the second valve part 681*c* of the valve 681, the second valve hole 683*a* and the cam 691, the second valve part 681*c*, the second valve hole 683*a* and the cam 691 are washed by the water sprayed from the spray holes 66*d*, and thus remaining of the detergent on the second valve part 681*c*, the second valve hole 683*a* and the cam 691 is prevented. Therefore, malfunction of the valves 681, generated if the liquid main detergent or fabric rinse remaining on the second valve parts 681*c*, the second valve holes 683*a* and the cams 691 is solidified, may be prevented.

Figure 12:
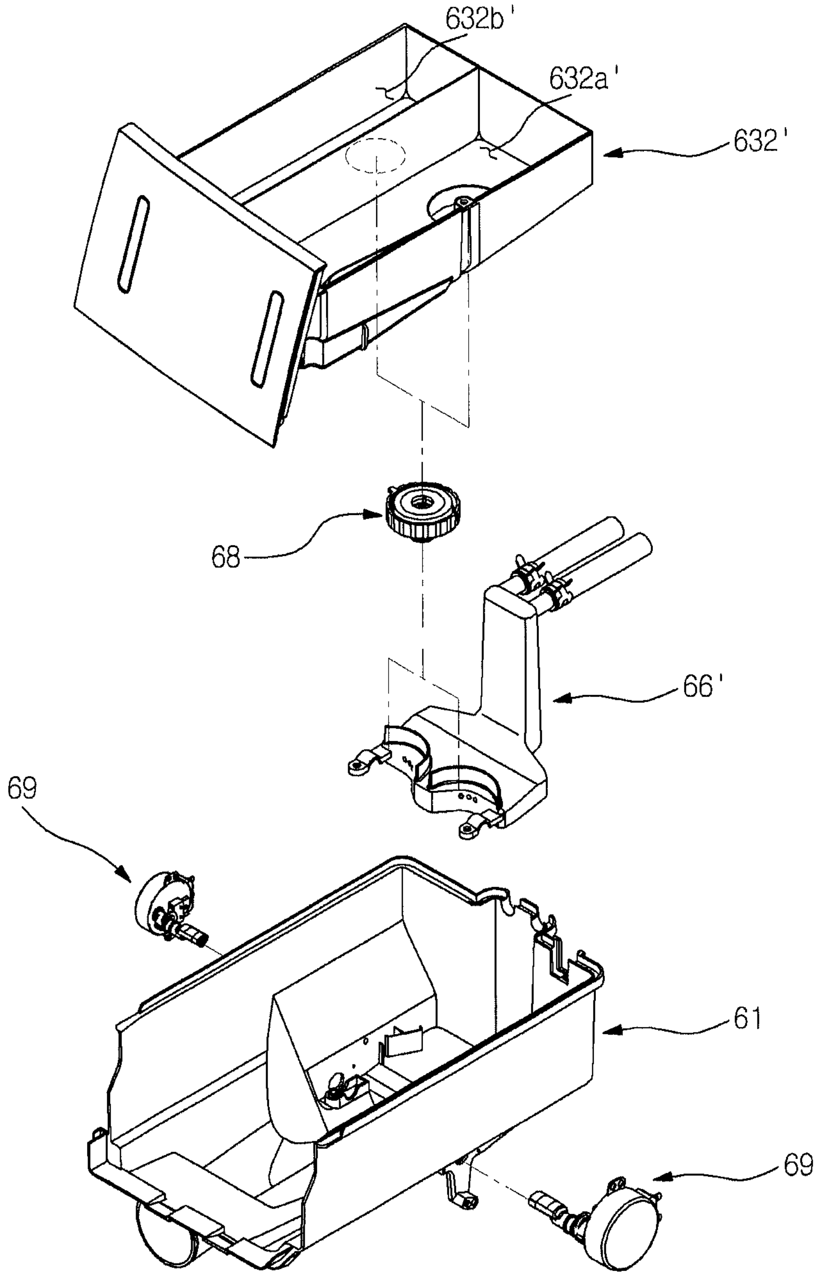
FIG. 12 is an exploded perspective view of a detergent supply device applied to a washing machine in accordance with another embodiment.

Although an embodiment illustrates the tray 632 as being divided into the main detergent accommodation part 632*b*, the rinse accommodation part 632*c*, the powdery detergent accommodation part 632*d* and the bleach accommodation part 632*e* to supply the main detergent and the fabric rinse through the automatic detergent supply method and to supply the powdery detergent and the bleach in the manual detergent supply method, the tray is not limited thereto. In accordance with another embodiment, as shown in FIG. 12, the tray 632' may include only a main detergent accommodation part 632*a'* and a rinse accommodation part 632*b'* without components corresponding to the powdery detergent accommodation part and the bleach detergent accommodation part, and the detergent supply device 60 includes a pair of valve units 68, a pair of valve drive device 69 and a water supply guide 66' to supply only a main detergent and a fabric rinse through the automatic detergent supply method.

Figure 13:
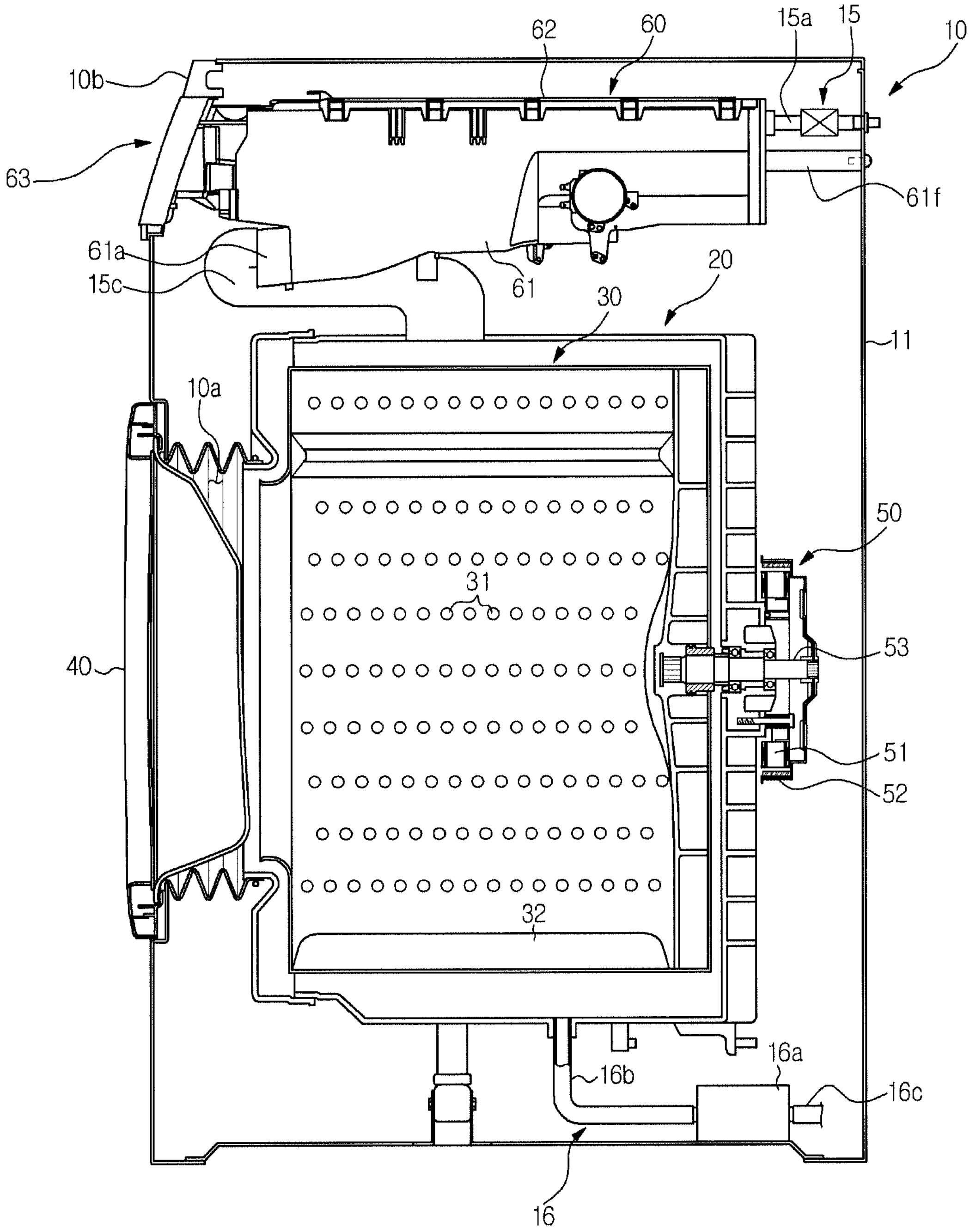
FIG. 13 is a schematic view of a washing machine in accordance with another embodiment.

Further, although an embodiment illustrates the rear end of the detergent housing 61 as being supported by the main body frame 11 through the support bar 13 and the support member 17, the detergent housing 61 is not limited thereto. As shown in FIG. 13, the detergent housing 61 may be installed within the main body frame 11 by fixing a coupling part 61*f* integrally extended from the rear surface of the detergent housing 61 to the rear end of the main body frame 11 through a fastening member, such as a screw.

Hereinafter, operation of the detergent supply device of the above-described washing machine will be described.

First, in order to use a liquid main detergent, a user operates the control panel 14 to execute washing under the condition that the manual supply selection button 14*a* is not selected. Thereby, the water supply valves 15*b* are controlled so as to supply water only to the automatic water supply guide 66, and the detergent supply motors 692 are driven to rotate the cams 691. Then, water is sprayed through the spray holes 66*d* provided at the front end of the automatic water supply guide 66 and a portion of the main detergent accommodated in the main detergent accommodation part 632*b* is discharged through the second valve hole 683*a*, simultaneously. The water and the main detergent are mixed within the detergent housing 61, and are then supplied to the tub 20 through the water supply hose 15*c*.

On the other hand, in order to use a powdery detergent, the user extracts the detergent accommodation box 63 from the detergent housing 61, puts the powdery detergent into the powdery detergent accommodation part 632*d* through the powdery detergent inlet 64*c*, and then retracts the detergent accommodation box 63 into the detergent housing 61.

When the user selects the manual supply selection button 14*a* in the above state and operates the control panel 14 to execute washing, the water supply valves 15*b* are controlled so as to supply water only to the powdery detergent water supply channel 67*b* of the manual water supply guide 67. Therefore, water is supplied to the powdery detergent accommodation part 632*d* through the water supply holes 67*d* provided on the manual water supply guide 67 and the powdery detergent inlet 64*c*, is mixed with the powdery detergent accommodated within the powdery detergent accommodation part 632*d*, and is then supplied to the tub 20 through the water supply hose 15*c*.

As is apparent from the above description, a washing machine in accordance with an embodiment has a detergent supply device which supplies a detergent through an automatic detergent supply method or a manual detergent supply method according to user's section, thereby using various types of detergent.

Further, the washing machine removes a liquid detergent remaining on valves by spraying water toward the valves through an automatic water supply guide, thereby preventing malfunction of the valves generated when the liquid detergent remaining on valve units is dried and solidified.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
a main body;
a tub disposed in the main body to contain water;
a drum rotatably installed in the tub; and
a detergent dispenser including:
a detergent dispenser housing,
a detergent container insertable into the detergent dispenser housing, and
a detergent container cover configured to cover the detergent container,
wherein the detergent container comprises:
a first accommodation portion configured to accommodate a first detergent and discharge the first detergent from the first accommodation portion through a valve unit, and
a second accommodation portion configured to accommodate a second detergent and discharge the second detergent from the second accommodation portion along with water, and
wherein the detergent container cover comprises:
a first opening through which the first detergent is supplied to the first accommodation portion, and
a second opening on the detergent container cover at a rear of the first opening, through which the second detergent is supplied to the second accommodation portion, and
an inclined guide adjacent to the second opening and downward inclined toward the second opening.

2. The washing machine of claim 1, wherein the detergent dispenser includes:
a water supply guide configured to, with the detergent container inserted into the detergent dispenser housing, supply the water to the second accommodation portion from above the second accommodation portion through the second opening.

3. The washing machine of claim 1, wherein the valve unit is configured so that, with the detergent container inserted into the detergent dispenser housing, the valve unit is below the first accommodation portion.

4. The washing machine of claim 3, wherein the valve unit includes a valve hole that, with the detergent container inserted into the detergent dispenser housing, is below the first accommodation portion and through which the first detergent accommodated in the first accommodation portion is discharged by the valve unit, and the detergent dispenser includes a first water supply guide to spray water so as to mix the sprayed water with the first detergent discharged through the valve hole.

5. The washing machine of claim 4, wherein the detergent dispenser includes:

a second water supply guide configured so that the water supplied to the second accommodation portion is supplied by the second water supply guide from above the second accommodation portion through the second opening with the detergent container inserted into the detergent dispenser housing.

* * * * *